United States Patent [19]

Way

[11] Patent Number: 5,787,634

[45] Date of Patent: Aug. 4, 1998

[54] SALTWATER FISHING LURE

[76] Inventor: David T. Way, 7510 Rowland Park Dr., San Antonio, Tex. 78249

[21] Appl. No.: 686,514

[22] Filed: Jul. 26, 1996

[51] Int. Cl.[6] ............................................. A01K 85/00
[52] U.S. Cl. ..................................... 43/42.15; 43/42.26
[58] Field of Search ........................... 43/42.15, 42.26, 43/42.28, 42.11, 42.02

[56] References Cited

U.S. PATENT DOCUMENTS

| | | | |
|---|---|---|---|
| 1,611,635 | 12/1926 | Dills | 43/42.26 |
| 1,792,366 | 2/1931 | Ettles | 43/42.15 |
| 2,334,792 | 11/1943 | Royston | 43/42.26 |
| 2,593,461 | 4/1952 | Jones | 42/42.15 |
| 2,663,964 | 12/1953 | Martin | 43/42.15 |
| 2,685,145 | 8/1954 | Dean | 43/42.15 |
| 2,758,409 | 8/1956 | Eslinger | 43/42.15 |
| 2,770,063 | 11/1956 | Martin | 43/42.02 |
| 2,819,553 | 1/1958 | Fultz | 43/42.26 |
| 3,191,336 | 6/1965 | Cordell | 43/42.28 |
| 3,284,944 | 11/1966 | Settle | 43/42.15 |
| 3,438,144 | 4/1969 | Lincoln | 43/42.15 |

*Primary Examiner*—Kurt Rowan

[57] ABSTRACT

A saltwater fishing lure including a body comprised of a plurality of interconnected shell members. A plurality of legs are each coupled with intermediate members of the body. A feeler is coupled with a head of the body. A pair of hooks are secured to bottom ends of the head and a tail of the body.

1 Claim, 3 Drawing Sheets

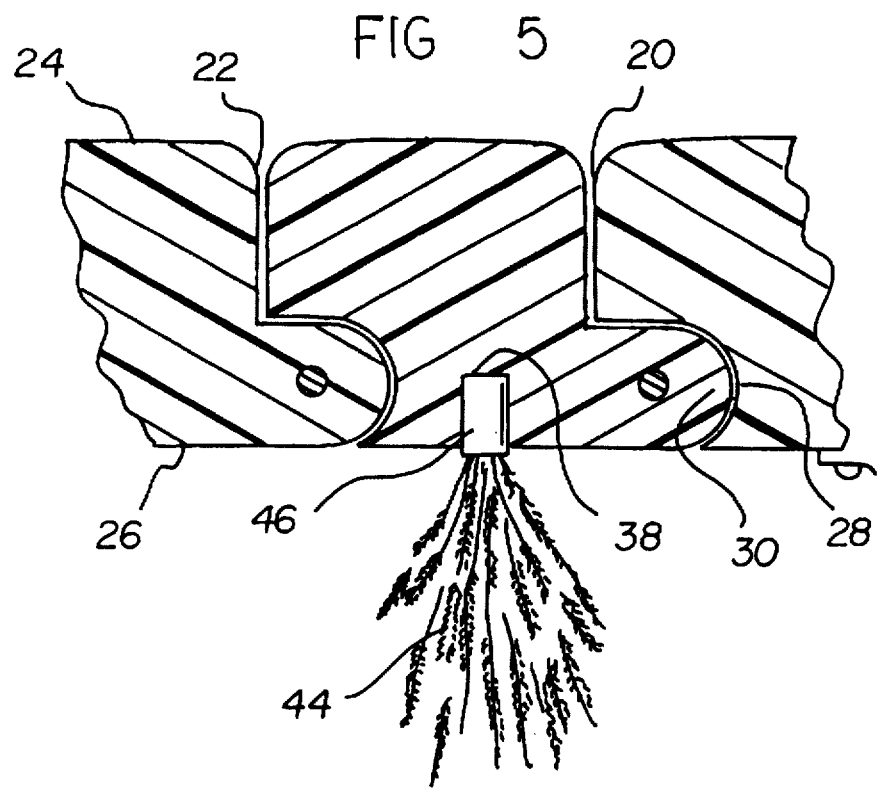
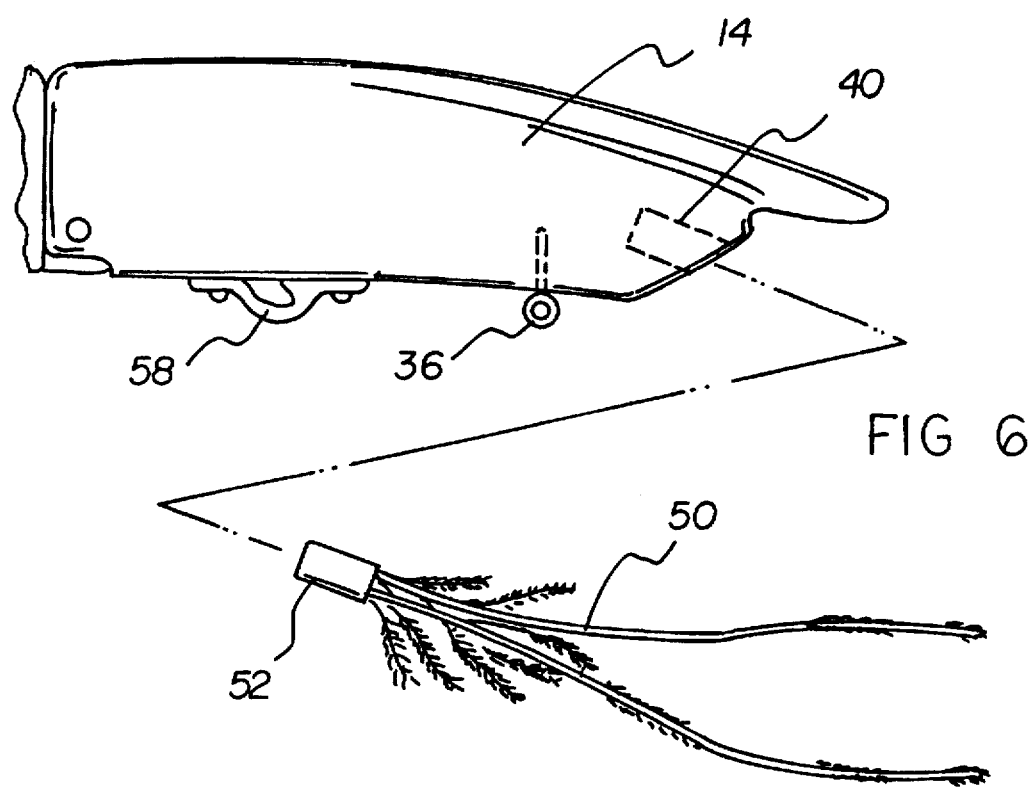

SALTWATER FISHING LURE

BACKGROUND OF THE INVENTION

1. Field of the Invention

The present invention relates to a saltwater fishing lure and more particularly pertains to imitating the sight, sound and movements of a live shrimp with a saltwater fishing lure.

2. Description of the Prior Art

The use of fishing lures is known in the prior art. More specifically, fishing lures heretofore devised and utilized for the purpose of attracting fish are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,992,800 to Neil discloses an action lure.

U.S. Pat. No. Des. 243,176 to Carver et al. discloses the ornamental design for a fishing lure.

U.S. Pat. No. Des. 255,593 to Hunter discloses the ornamental design for a fishing lure.

U.S. Pat. No. 4,823,497 to Pierce discloses a rattling, glowing, scent dispensing fishing lure.

U.S. Pat. No. Des. 352,345 to Stieh discloses the ornamental design for an overhead plant watering device.

U.S. Pat. No. Des. 354,329 to Long discloses the ornamental design for a fishing lure.

While these devices fulfill their respective, particular objective and requirements, the aforementioned patents do not describe a saltwater fishing lure for imitating the sight, sound and movements of a live shrimp.

In this respect, the saltwater fishing lure according to the present invention substantially departs from the conventional concepts and designs of the prior art, and in doing so provides an apparatus primarily developed for the purpose of imitating the sight, sound and movements of a live shrimp.

Therefore, it can be appreciated that there exists a continuing need for new and improved saltwater fishing lure which can be used for imitating the sight, sound and movements of a live shrimp. In this regard, the present invention substantially fulfills this need.

SUMMARY OF THE INVENTION

In the view of the foregoing disadvantages inherent in the known types of fishing lures now present in the prior art, the present invention provides an improved saltwater fishing lure. As such, the general purpose of the present invention, which will be described subsequently in greater detail, is to provide a new and improved saltwater fishing lure and method which has all the advantages of the prior art and none of the disadvantages.

To attain this, the present invention essentially comprises a body comprising a plurality of interconnected shell members. The interconnected shell members include a head, a tail and intermediate members therebetween. Each of the shell members has a forward end, a rearward end, a top end and a bottom end. The intermediate members each have a recess formed in the rearward end thereof and a protrusion extending outwardly of the forward end thereof. The protrusion of a member is pivotally coupled with the recess of a member positioned forwardly. The head has a recess formed in the rearward end thereof to pivotally couple with the protrusion of a forwardmost intermediate member. The tail has a protrusion formed in the forward end thereof for pivotally coupling with the recess of a rearwardmost intermediate member. The bottom end of the head has an eyelet extending downwardly therefrom. The bottom end of the intermediate members each have an aperture formed therein. The forward end of the head has an aperture therein. The device includes a plurality of legs each having a plug disposed on an upper end thereof. Each plug is dimensioned for coupling with the aperture formed in the bottom end of the intermediate members. The device includes a feeler having a plug disposed on an end thereof. The plug is dimensioned for coupling with the aperture formed in the forward end of the head. A pair of hooks are secured to the bottom ends of the head and the tail of the body.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved saltwater fishing lure which has all the advantages of the prior art fishing lures and none of the disadvantages.

It is another object of the present invention to provide a new and improved saltwater fishing lure which may be easily and efficiently manufactured and marketed.

It is a further object of the present invention to provide a new and improved saltwater fishing lure which is of durable and reliable construction.

An even further object of the present invention is to provide a new and improved saltwater fishing lure which is susceptible of a low cost of manufacture with regard to both materials and labor, and which accordingly is then susceptible of low prices of sale to the consuming public, thereby making such a saltwater fishing lure economically available to the buying public.

Even still another object of the present invention is to provide a new and improved saltwater fishing lure for imitating the sight, sound and movements of a live shrimp.

Lastly, it is an object of the present invention to provide a new and improved saltwater fishing lure including a body comprised of a plurality of interconnected shell members. A plurality of legs are each coupled with intermediate members of the body. A feeler is coupled with a head of the body. A pair of hooks are secured to bottom ends of the head and a tail of the body.

3

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cross-sectional view as taken along line 5—5 of FIG. 3.

FIG. 6 is a side view of the present invention illustrating the removable feeler.

The same reference numerals refer to the same parts through the various Figures.

DESCRIPTION OF THE PREFERRED EMBODIMENT

Figure 1:
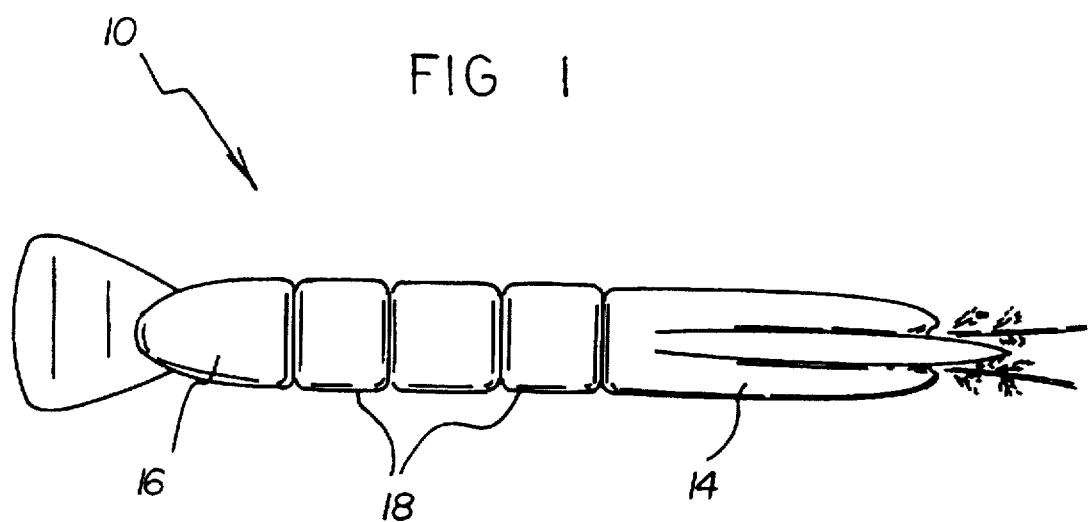
FIG. 1 is a plan view of the preferred embodiment of the saltwater fishing lure constructed in accordance with the principles of the present invention.
Figure 2:
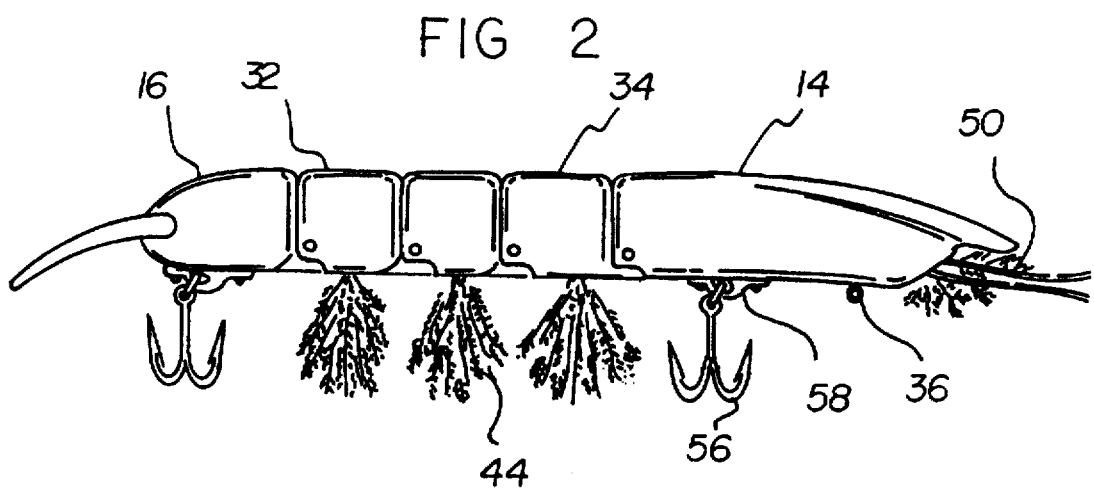
FIG. 2 is a side elevation view of the present invention in an extended orientation.
Figure 3:
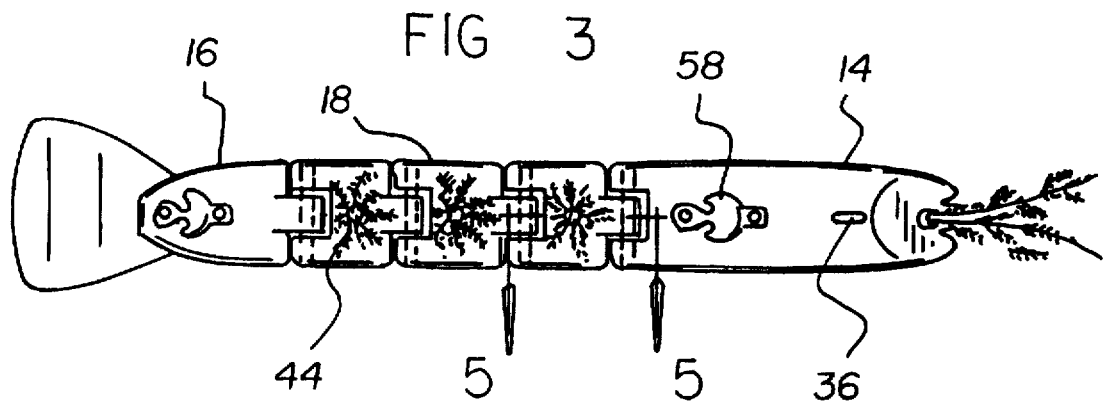
FIG. 3 is a bottom view of the present invention in the extended orientation.
Figure 4:
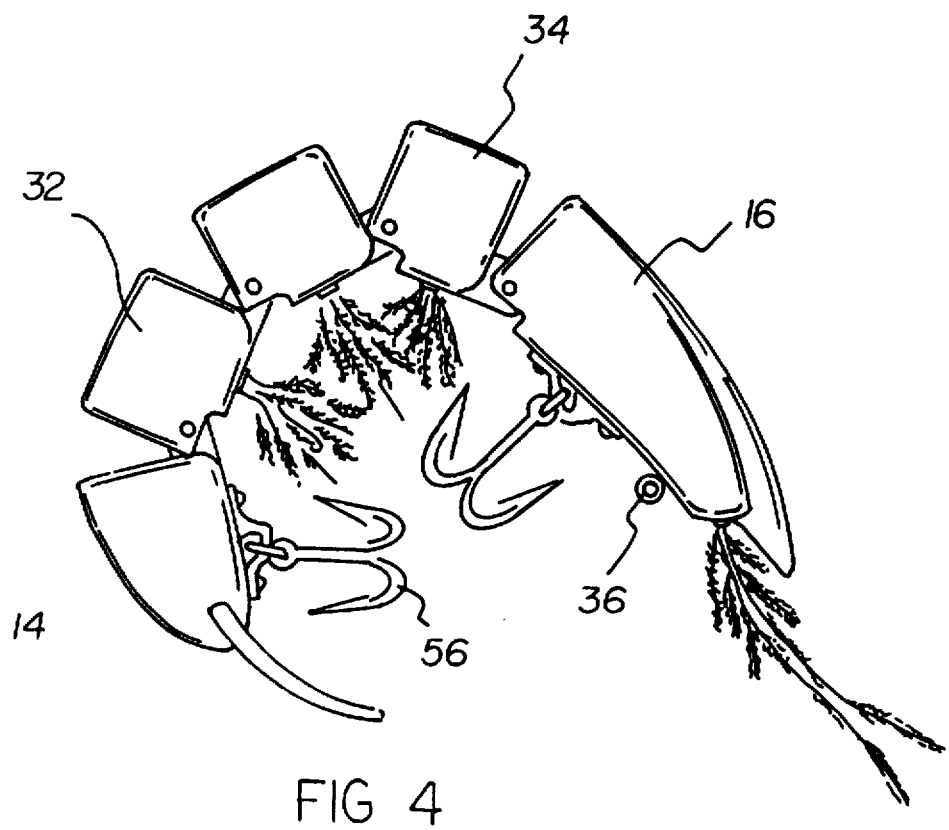
FIG. 4 is a side elevation view of the present invention in a curled orientation.

With reference now to the drawings, and in particular, to FIGS. 1–6 thereof, the preferred embodiment of the new and improved saltwater fishing lure embodying the principles and concepts of the present invention and generally designated by the reference number 10 will be described.

Specifically, it will be noted in the various Figures that the device relates to a saltwater fishing lure for imitating the sight, sound and movements of a live shrimp. In its broadest context, the device consists of a body, a plurality of legs, a feeler and a pair of hooks. Such components are individually configured and correlated with respect to each other so as to attain the desired objective.

The device 10 includes a body 12 comprising a plurality of interconnected shell members. The interconnected shell members include a head 14, a tail 16 and intermediate members 18 therebetween. Each of the shell members has a forward end 20, a rearward end 22, a top end 24 and a bottom end 26. The intermediate members 18 each have a recess 28 formed in the rearward end 22 thereof and a protrusion 30 extending outwardly of the forward end 20 thereof. The protrusion 30 of a member is pivotally coupled with the recess 28 of a member positioned forwardly. The head 14 has a recess 28 formed in the rearward end 22 thereof to pivotally couple with the protrusion 30 of a forwardmost intermediate member 32. The tail 16 has a protrusion 30 formed in the forward end 20 thereof for pivotally coupling with the recess 28 of a rearwardmost intermediate member 34. The bottom end 26 of the head 14 has an eyelet 36 extending downwardly therefrom. The eyelet 36 allows for the attachment of a fishing line thereto. The bottom end 26 of the intermediate members 18 each

4 have an aperture 38 formed therein. The forward end 20 of the head 14 has an aperture 40 therein.

The device 10 includes a plurality of legs 44 each having a plug 46 disposed on an upper end thereof. Each plug 46 is dimensioned for coupling with the aperture 38 formed in the bottom end 26 of the intermediate members 18. The plurality of legs 44 are preferably fabricated of feathers that will become easily saturated when introduced to water.

The device 10 also includes a feeler 50 having a plug 52 disposed on an end thereof. The plug 52 is dimensioned for coupling with the aperture 40 formed in the forward end 20 of the head 14. The feeler 50 is also preferably fabricated of feather.

Lastly, a pair of hooks 56 are secured to the bottom ends 26 of the head 14 and the tail 16 of the body 12. The pair of hooks 56 are secured to the body 12 by hook clasps 58. The hooks 56 will engage the predator fish that attacks the device 10.

In use, the body 12 is designed to characterize a shrimp in sound and in action. When the device 10 is introduced into the water, its feeler 50 and legs 44 become saturated and appear life-like when moved by current and manually when the user jerks of the line attached to the eyelet 36. After the device 10 is cast into the water, the device 10 sinks within the water in an inverted position with the body 12 forming a "U" shape. Once the device 10 is retrieved, the positioned of the line within the eyelet 36 forces the head 14 up, thereby extending the body 12 of the device 10 thus mocking motions ordinarily made by a shrimp when swimming. The shell members of the body 12 are forced together thereby making a clicking sound of a shrimp swimming away in danger.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A saltwater fishing lure for imitating the sight, sound and movements of a live shrimp comprising, in combination:

a body comprising a plurality of interconnected shell members, the interconnected shell members including a head, a tail and intermediate members therebetween, each of the shell members having a forward end, a rearward end, a top end and a bottom end, the intermediate members, each having a recess formed in the rearward end thereof and a protrusion extending outwardly of the forward end thereof, the protrusion of a member being pivotally coupled with the recess of a member positioned forwardly, the head having a recess formed in the rearward end thereof to pivotally couple with the protrusion of a forwardmost intermediate member, the tail having a protrusion extending outwardly of the forward end thereof for pivotally coupling with the recess of a rearwardmost intermediate member, the bottom end of the head having an eyelet extending downwardly therefrom, the bottom end of the intermediate members each having an aperture formed therein, the forward end of the head having an aperture therein, the body being formed in an inverted U-shaped configuration when positioned within water;

a plurality of legs each having a plug disposed on an upper end thereof, each plug being dimensioned for coupling with the aperture formed in the bottom end of the intermediate members, the plurality of legs being fabricated of feathers to provide movement when within water;

a feeler having a plug disposed on an end thereof, the plug being dimensioned for coupling with the aperture formed in the forward end of the head, the feeler being constructed from feathers;

a pair of hooks secured to the bottom ends of the head and the tail of the body.

* * * * *